No. 733,506. PATENTED JULY 14, 1903.
C. REDD.
MACHINE FOR CLOSING AND SEALING UP THE ENDS OF CARTONS.
APPLICATION FILED FEB. 7, 1901.
NO MODEL. 10 SHEETS—SHEET 7.
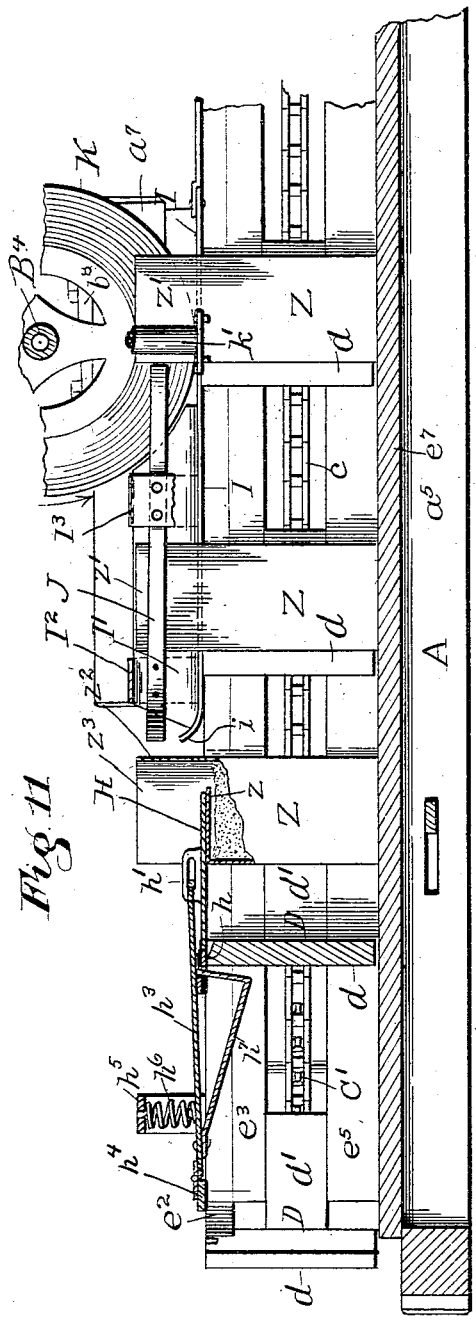
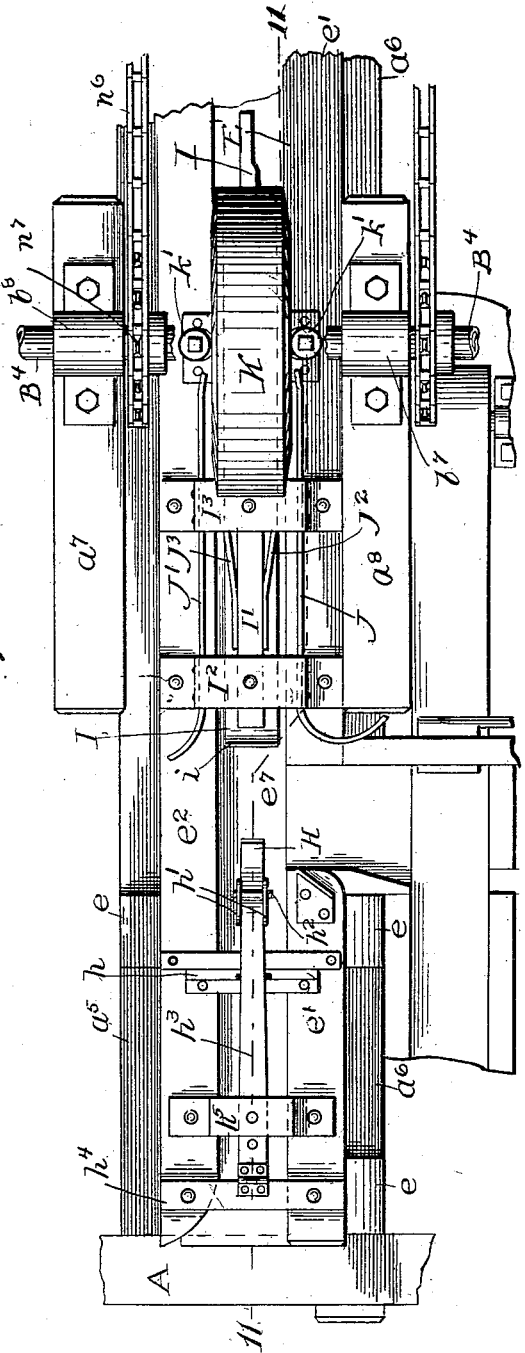

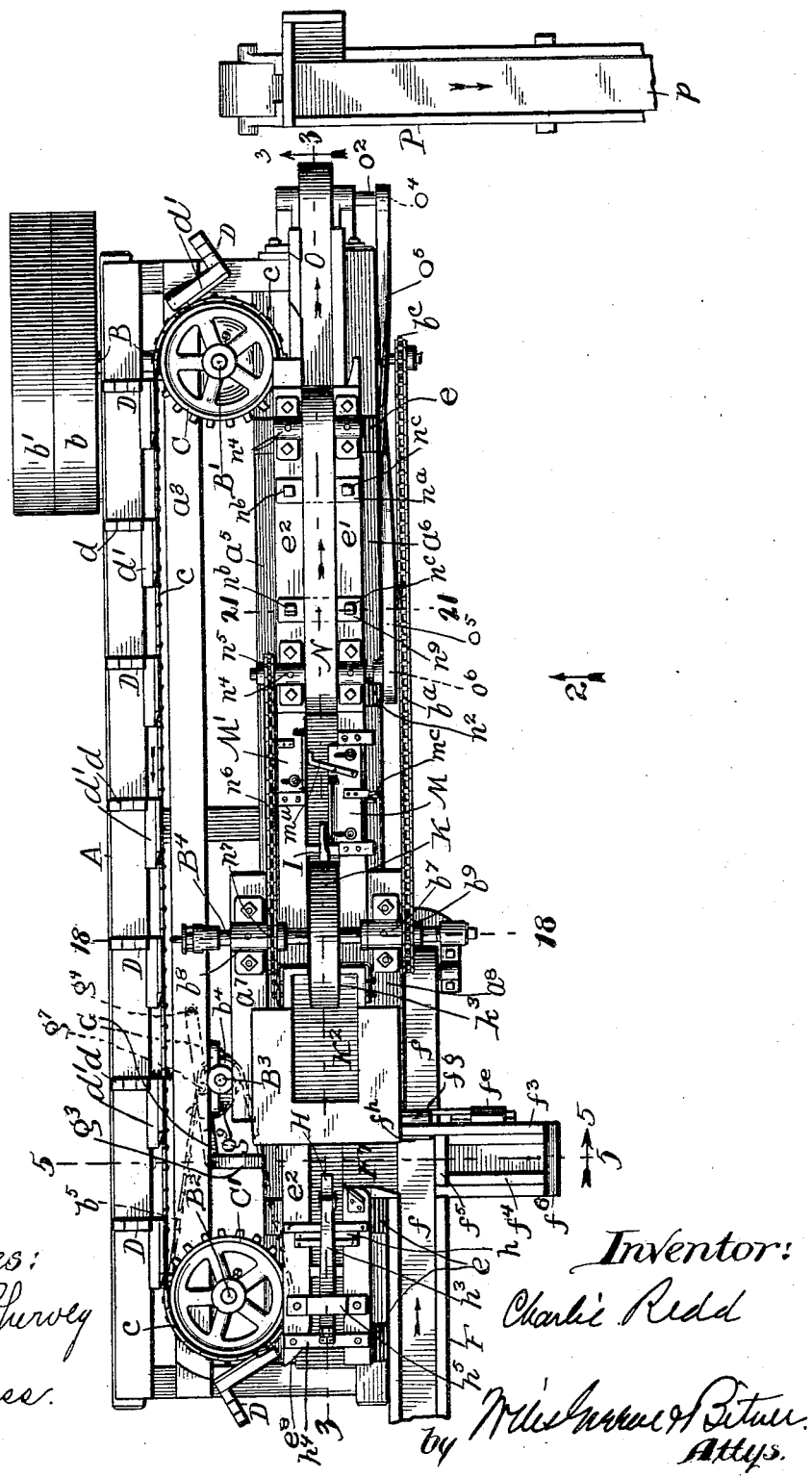

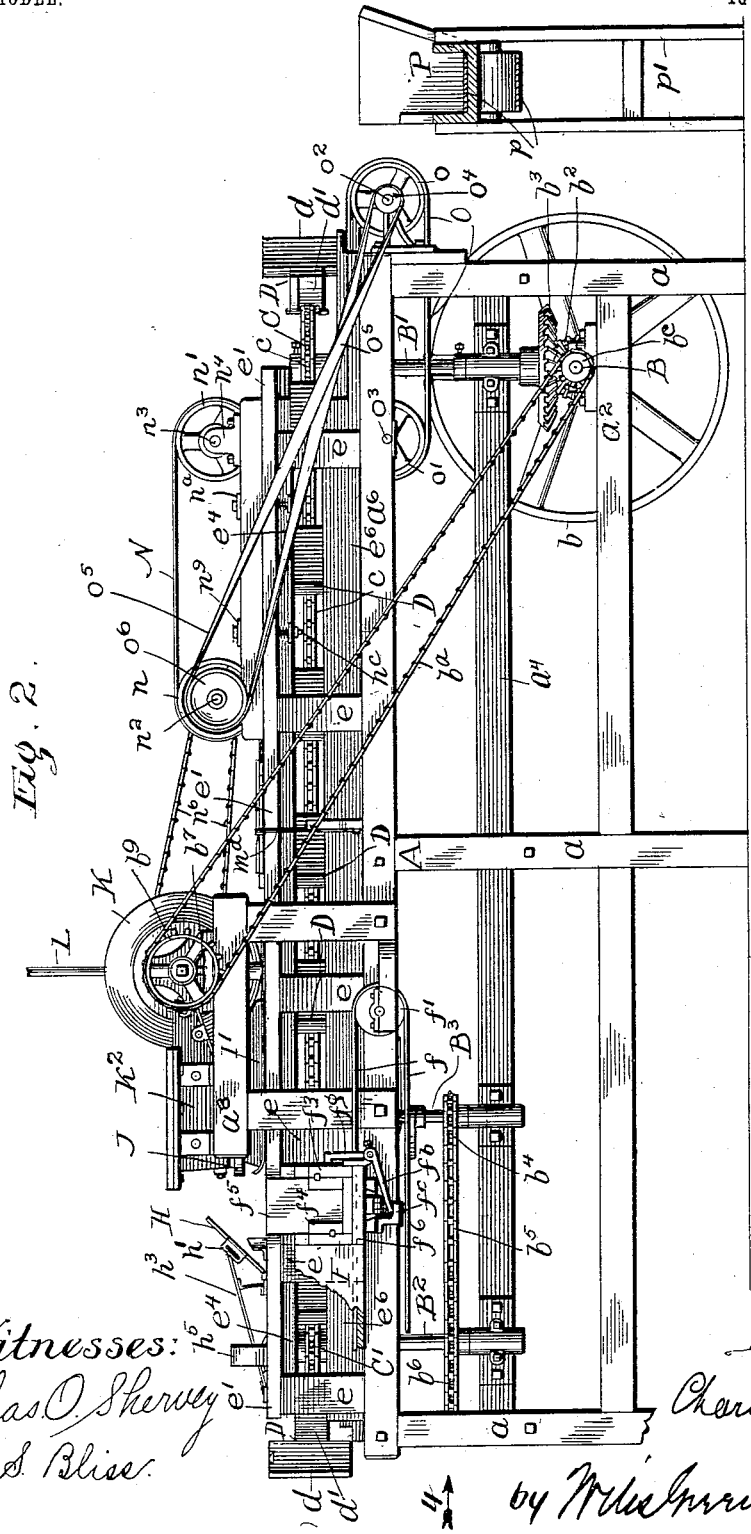

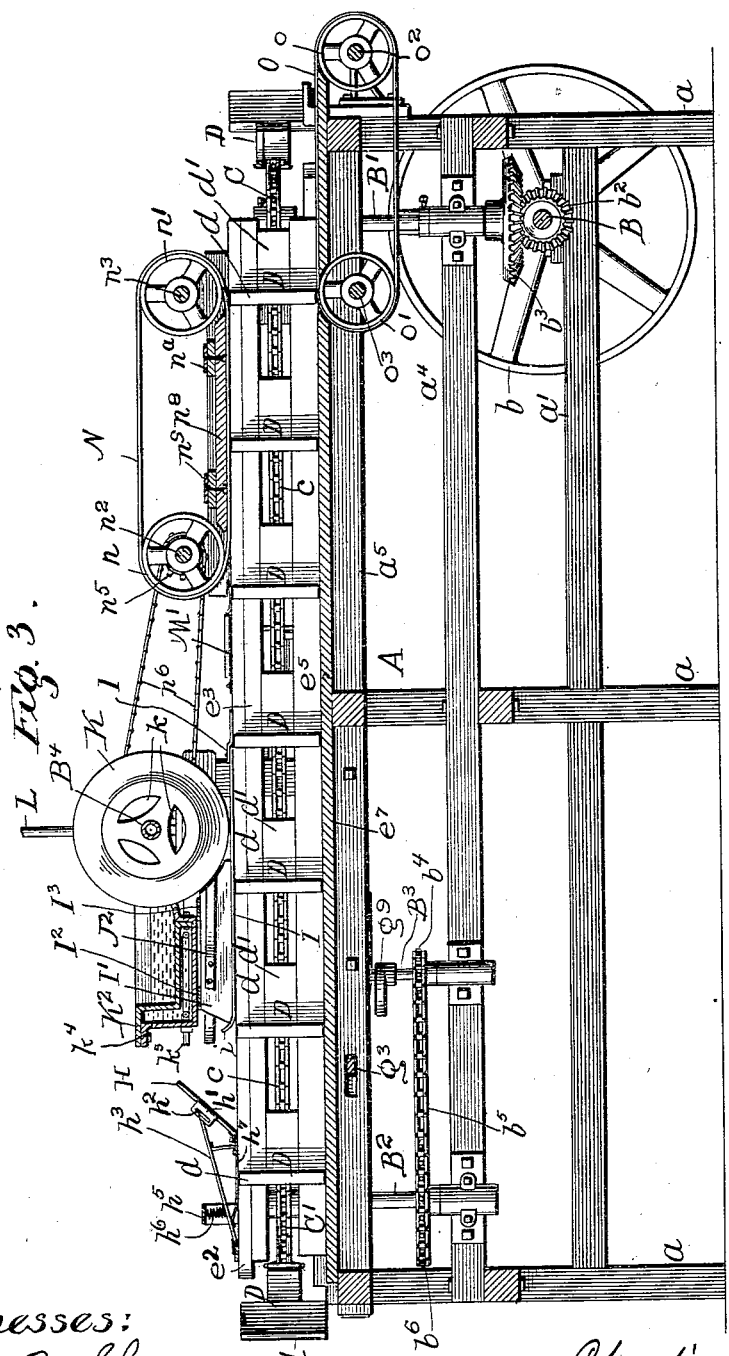

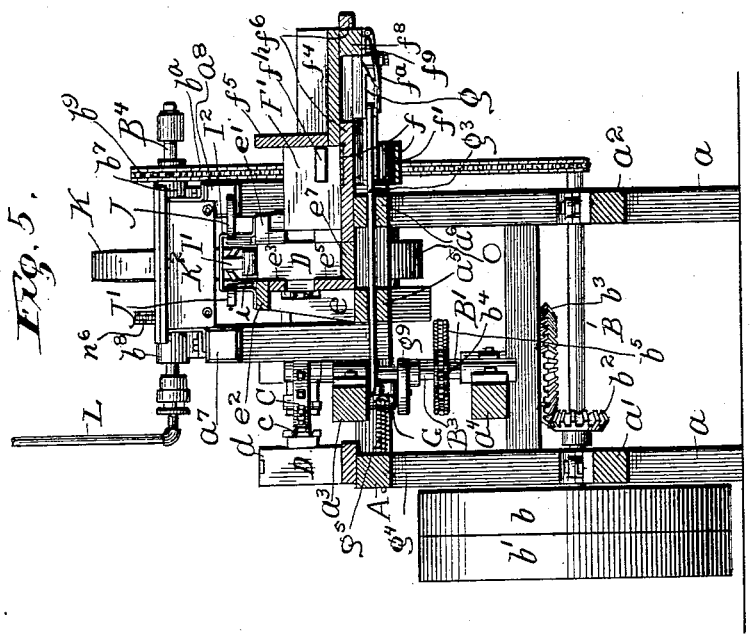
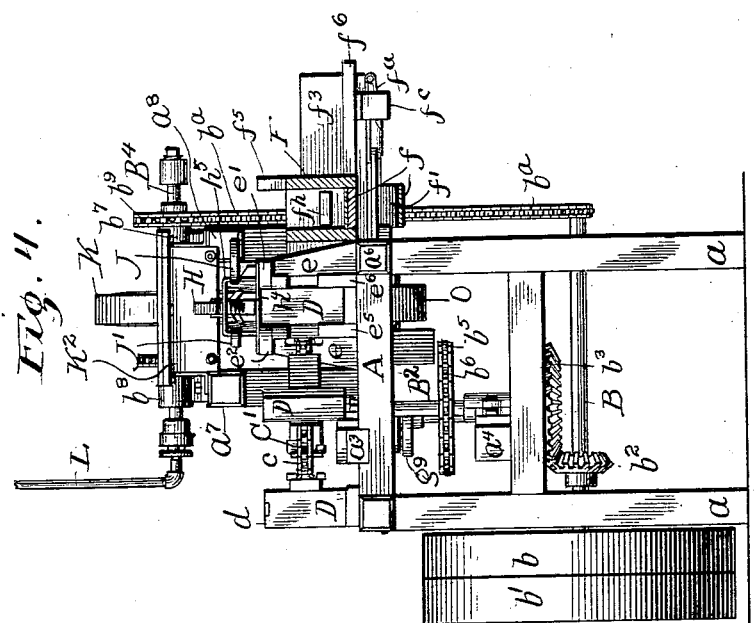

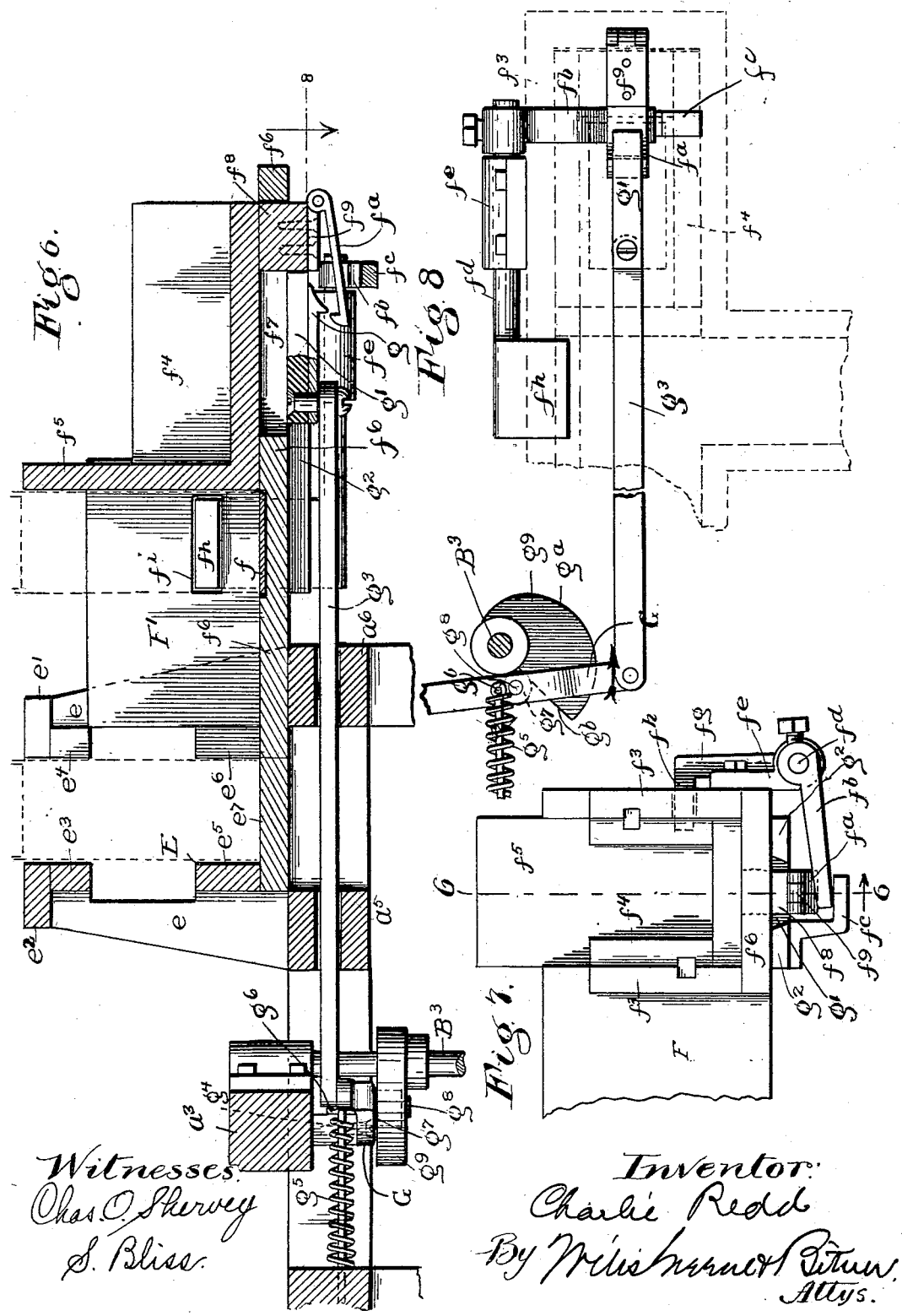

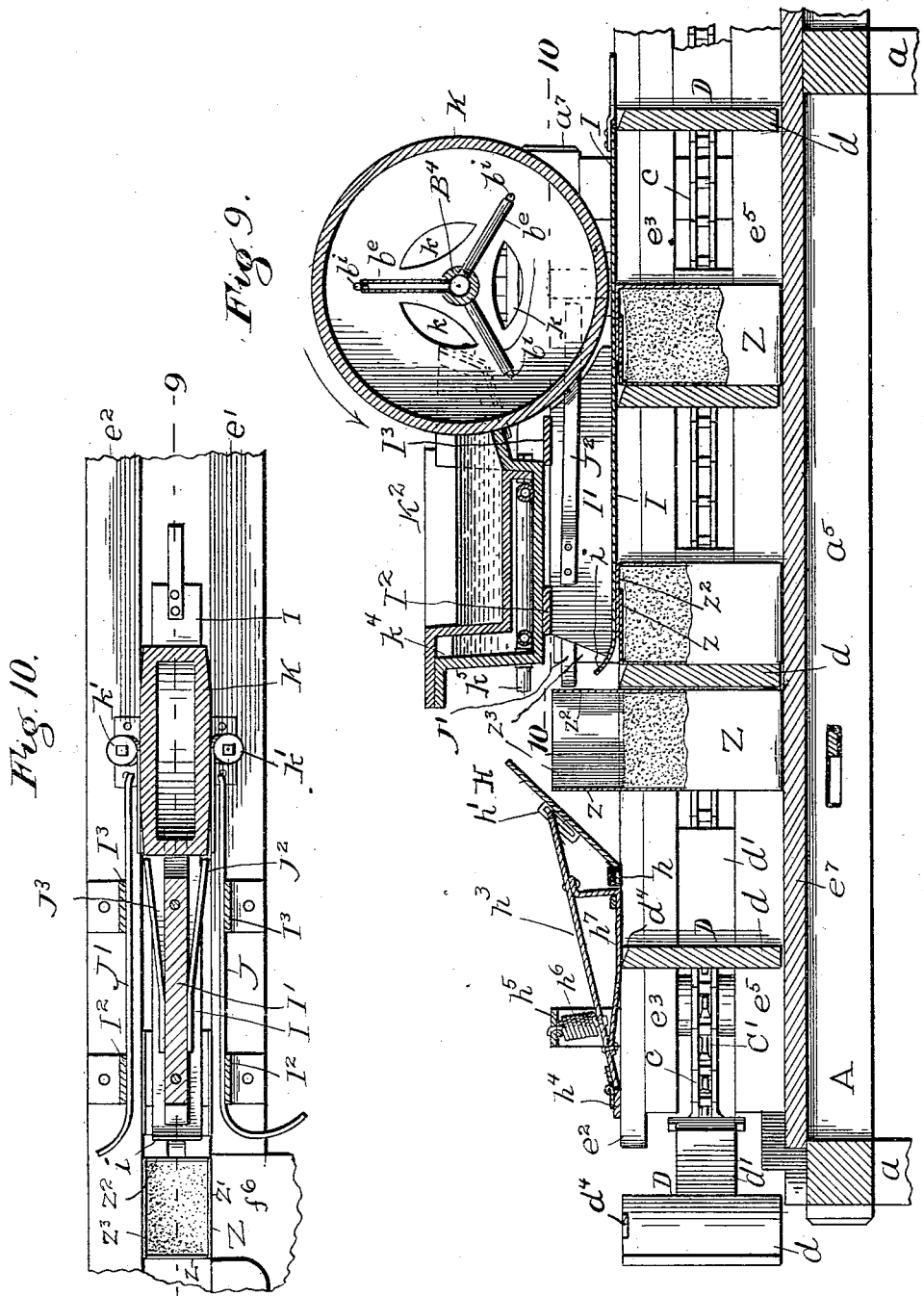

No. 733,506. PATENTED JULY 14, 1903.
C. REDD.
MACHINE FOR CLOSING AND SEALING UP THE ENDS OF CARTONS.
APPLICATION FILED FEB. 7, 1901.
NO MODEL. 10 SHEETS—SHEET 8.
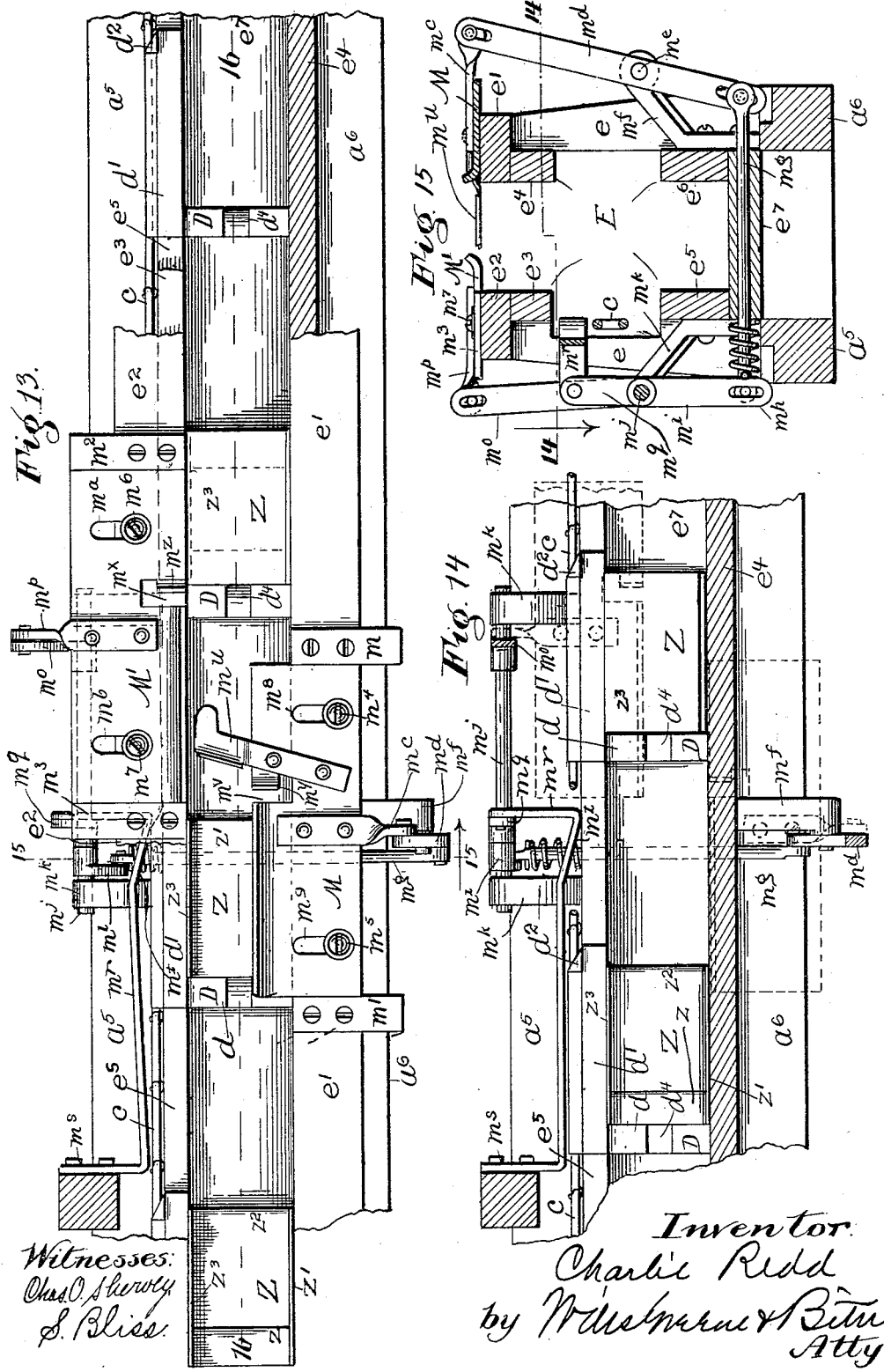
Witnesses:
Chas O. Shewey
S. Bliss.
Inventor.
Charlie Redd
by Wishburne & Bitner
Attys.

No. 733,506. PATENTED JULY 14, 1903.
C. REDD.
MACHINE FOR CLOSING AND SEALING UP THE ENDS OF CARTONS.
APPLICATION FILED FEB. 7, 1901.
NO MODEL. 10 SHEETS—SHEET 9.
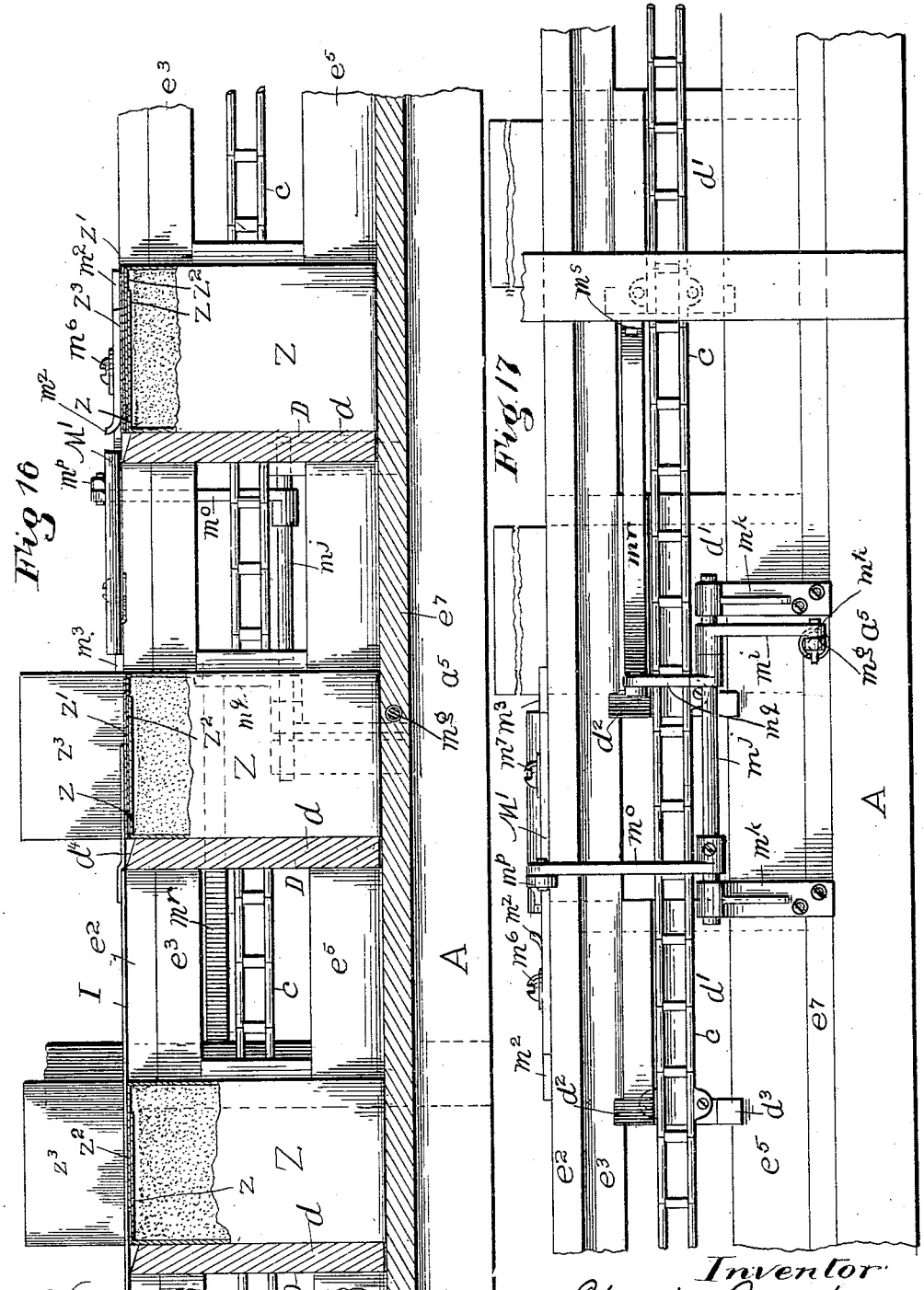

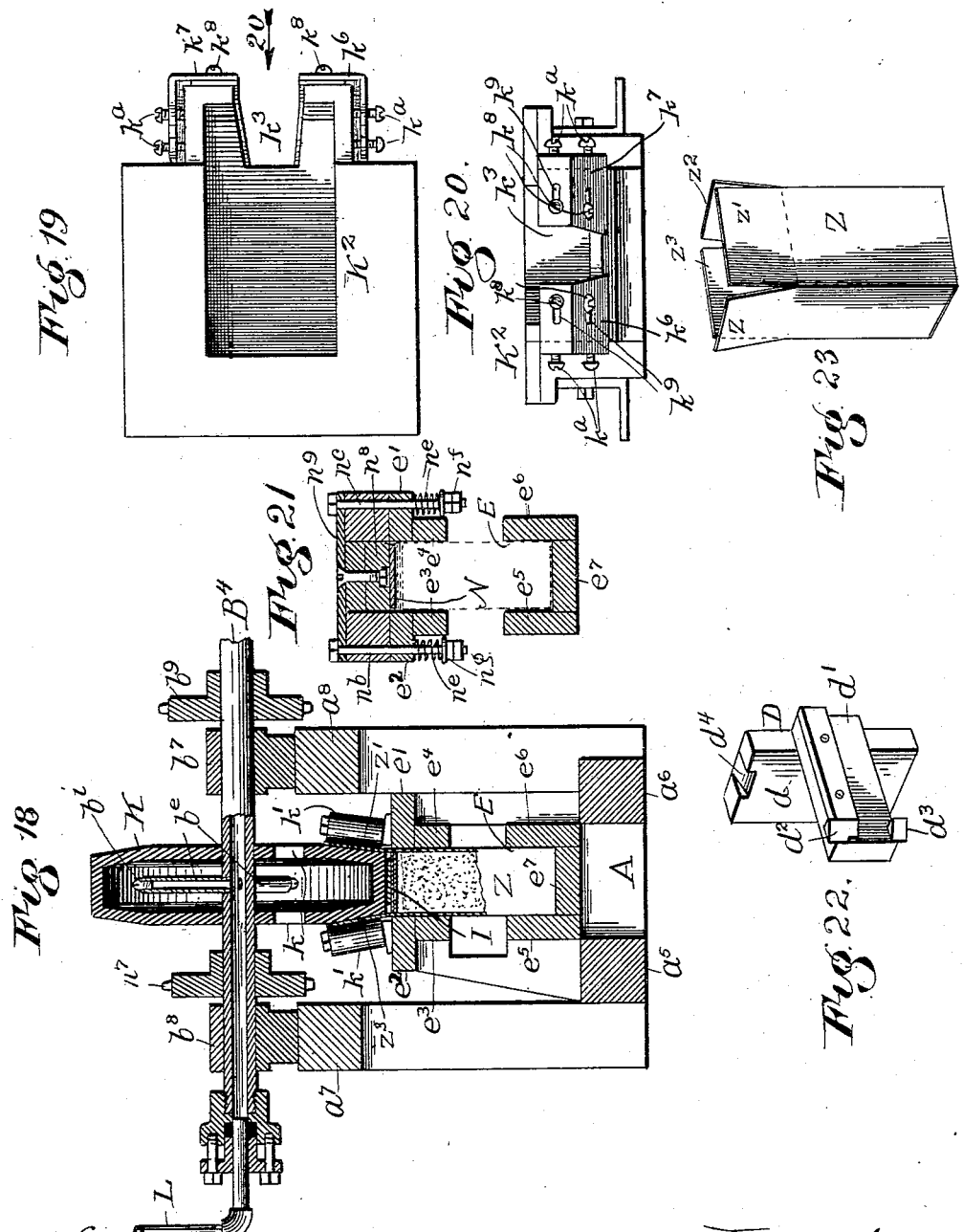

No. 733,506. Patented July 14, 1903.

UNITED STATES PATENT OFFICE.

CHARLIE REDD, OF CHICAGO, ILLINOIS, ASSIGNOR, BY MESNE ASSIGNMENTS, TO ISAAC PIESER AND CHARLES G. LIVINGSTON, OF CHICAGO, ILLINOIS.

MACHINE FOR CLOSING AND SEALING UP THE ENDS OF CARTONS.

SPECIFICATION forming part of Letters Patent No. 733,506, dated July 14, 1903.

Application filed February 7, 1901. Serial No. 46,319. (No model.)

*To all whom it may concern:*

Be it known that I, CHARLIE REDD, a citizen of the United States of America, residing at Chicago, in the county of Cook and State of Illinois, have invented certain new and useful Improvements in Machines for Closing and Sealing up the Ends of Cartons, of which the following is a specification.

My invention relates to certain improvements in machines for closing and sealing up the ends of cartons. It is designed with especial reference to sealing up filled packages, the various elements being constructed and arranged with this particular purpose in view. Many of the novel features are, however, applicable to machines for closing one end of an empty package.

The object of the invention is to make certain improvements in the construction and operation of this class of machines for the purpose of increasing the capacity and ease of manipulation and improving the condition and appearance of the package after it has passed through the machine.

To such end the invention consists in certain novel features which will be described in full in connection with other portions of the mechanisms and the essential characteristics of which will be pointed out in the claims.

In the drawings, Figure 1 is a plan view of an entire machine built according to the preferred form of my invention. Fig. 2 is a side elevation looking from the arrow 2 of Fig. 1. Fig. 3 is a vertical longitudinal section in line 3 3 of Fig. 1 looking in the direction of the arrow 3. Fig. 4 is an end view looking from the arrow 4 of Fig. 2. Fig. 5 is a vertical transverse section in the line 5 5 of Fig. 1 looking in the direction of the arrow 5. Fig. 6 is a detail transverse section in the same plane as Fig. 5, which plane is also indicated as 6 6, Fig. 7, said Fig. 6 being drawn upon a larger scale than Fig. 5 and omitting many of the parts seen in the latter figure. Fig. 7 is an enlarged detail of the side elevation, Fig. 2. Fig. 8 is a detail plan of some of the parts shown in Fig. 6, said Figs. 6, 7, and 8 being designed to illustrate the automatically-operating feed-slide by means of which the packages themselves are enabled to actuate the feeding devices to advance the packages to the main conveyer. Fig. 9 is a longitudinal vertical section in the line 9 9 of Fig. 10. Fig. 10 is a horizontal section in the line 10 10 of Fig. 9. Fig. 11 is a longitudinal vertical section in the plane 11 11 of Fig. 12. Fig. 12 is a partial plan of the part of the machine shown in Fig. 11. Fig. 13 is a plan, broken away at places, showing the mechanism for closing in the side flaps with the parts above said mechanism removed. Fig. 14 is a horizontal detail section in line 14 14 of Fig. 15. Fig. 15 is a transverse section in the line 15 15 of Fig. 13. Fig. 16 is a detail longitudinal section in line 16 16 of Fig. 13. Fig. 17 is a detail side elevation opposite to that shown in Fig. 2. Fig. 18 is a transverse vertical section in the line 18 18 of Fig. 1. Fig. 19 is a plan of the glue-pot. Fig. 20 is an elevation looking from the arrow 20 of Fig. 19. Fig. 21 is a detail cross-section in line 21 21 of Fig. 1, showing a spring-pressed pressure-board. Fig. 22 is a detail perspective of one of a series of conveyer-wings on the conveyer-chain, and Fig. 23 is a perspective of the sort of a carton with which the machine is intended to deal.

Referring to the drawings, A is a rectangular framework shown as resting upon six legs $a$, secured together by the necessary longitudinal and transverse members to make a complete and substantial frame and to provide the necessary support for the various parts of the mechanism. Upon two opposite members $a'$ $a^2$ is supported a transverse driving-shaft B, carrying a driving-pulley $b$ and a loose pulley $b'$, adapted to receive a suitable belt, by means of which the machine may be driven. Between the opposite side pieces of the frame the shaft B carries a bevel-pinion $b^2$, Fig. 5, in mesh with a bevel-gear $b^3$ upon a vertical shaft B', journaled upon two longitudinal members $a^3$ $a^4$ of the frame. On the upper end of the shaft is a sprocket-wheel C, on which runs a conveyer-chain $c$, extending longitudinally of the machine and running over a sprocket-wheel C' at the other end and fast upon a vertical shaft $B^2$, journaled in bearings upon said longitudinal members $a^3$ $a^4$ of the frame.

At intervals along the conveyer-chain are secured a series of wings or paddles D, a perspective of which is seen in Fig. 22, said paddles having transverse vertical blocks $d$ and longitudinal guiding-blocks $d'$, the latter being secured to the chain and being provided with beveled projections $d^2$, the function of which will be described later. On two longitudinal members of the frame $a^5$ $a^6$, Figs. 5 and 15, are secured a series of upright standards $e$, carrying longitudinal bars $e'$ $e^2$ upon their tops, lateral guides $e^3$ $e^4$ $e^5$ $e^6$ between them, and a supporting-platform $e^7$ at their bottom, making in all a trough-like structure E, preferably proportioned to the size of the particular package to be sealed and adapted to guide said package in its progress through the operating portions of the machine. The blocks $d'$ of the conveyer-wings are guided between the side boards $e^3$ $e^5$ of the trough and are held laterally in proper relation thereto by engagement of the transverse block $d$ and the projections $d^2$ $d^3$ with the opposite sides of these side boards. The end $e^8$ of the top boards $e^2$ of the trough, as seen in Fig. 1, is rounded to accommodate the wings $d$ of the conveyer and to guide them into the interior of the trough.

A feed-trough F, Fig. 1, is supported at one end upon the framework of the machine and extends therefrom any desired distance to the point from which the packages are to be brought, said trough being preferably of sufficient length to accommodate any slight accumulation of packages when the machine is being run to its fullest capacity. Along the bottom of this trough runs a traveling belt $f$, which passes over a loose pulley $f'$, Fig. 2, and is driven by any suitable means, the means employed in this machine being at the opposite end of the belt and not shown in the drawings. The belt moves along the bottom of the trough in the direction shown by the arrow, and at the end of the feed-trough is a transverse feed-chute F', Fig. 1, a laterally-projecting portion $f^3$ of which contains a feed-slide $f^4$, the forward face $f^5$ of which pushes the packages laterally from the feed-belt into the feed-chute. Larger details of this feed-chute are shown in Figs. 6, 7, and 8. The bottom of the chute $f^6$, Fig. 6, contains a slot $f^7$, through which projects a block $f^8$, secured to the bottom of the feed-slide and having upon its lower side a hinge-plate $f^9$, to which is hinged a gravity dog or hook $f^a$, resting upon a pivoted finger $f^b$, which in its lower position rests upon a bracket $f^c$, supported beneath the chute. The finger $f^b$ is fast upon a short pivot-shaft $f^d$, supported in a bearing $f^e$, secured to the chute, said shaft carrying at its opposite end a vertical arm $f^g$, the top $f^h$ of which extends horizontally through an opening $f^i$ into the feed-chute and projects sufficiently into the path of the packages as they are fed to the machine to engage such packages and be forced outward thereby sufficiently to raise the finger $f^b$ until the dog $f^a$ engages a hook $g$, fast to a slide $g'$, guided in dovetail guides $g^2$, Fig. 7, and reciprocated by means of a link $g^3$, pivoted to the slide at one end and at its opposite end to a swinging lever G, the opposite end of said lever being pivoted to the frame at $g^4$. A push-spring $g^5$, bearing upon the frame and upon a pin $g^6$ between the ends of the lever G, tends to crowd the parts into the position seen in Figs. 6 and 8, and a roller $g^7$ upon a pin $g^8$, secured to the lever G between its ends, runs upon a cam $g^9$, fast upon a shaft $B^3$, journaled upon the longitudinal members $a^3$ $a^4$ of the frame, as seen in Fig. 5, and bearing a sprocket-wheel $b^4$, rotated by a chain $b^5$, driven by a sprocket-wheel $b^6$, fast upon the vertical shaft $B^2$. The direction of movement of the cam is shown by the arrow, and said cam has a curved face $g^a$ and a substantially radial face $g^b$, the curved face serving to draw the hook $g$ away from the dog $f^a$, the radial face permitting the spring $g^5$ to return said hook to its former position. Said hook is therefore reciprocated back and forth at given intervals, timed with reference to the approach of the wings of the conveyer to the feed-chute, so that when the feed-slide is actuated the foremost package will be advanced into the path of one of the conveyer-wings at the proper moment. The feed-slide is actuated by engagement of the dog $f^a$ of the hook $g$, and such engagement is brought about by the pressure of the foremost package on the traveling belt $f$ against the end $f^h$ of the arm $f^g$. The rocking of said arm by the package raises the finger $f^b$, which in turn lifts the dog $f^a$ and holds it in engagement with the hook until the feed-slide is carried inward and returned again to the original position.

Looking at Figs. 9, 11, and 12, a folding-plate H will be seen hinged at one end to a cross-piece $h$, secured across the top of the trough, the upper side of said folding-plate being provided with a pair of slotted guides $h'$, in which runs a pin $h^2$ upon the end of a pivoted arm $h^3$, hinged at its opposite end to a cross-bar $h^4$, also secured to the top of the trough. A bridge $h^5$, similarly secured, provides a support for one end of a spring $h^6$, the other end of which pushes down upon the arm $h^3$. A cam-plate $h^7$ upon the bottom of the arm is engaged by the wings of the conveyer to raise said arm, said wings being provided with beveled notches $d^4$ where the engagement is effected. As the wing slides under the cam the folding-plate is raised until the wing passes beneath the cam, when the spring $h^6$ forces the plate down and folds inward one side of the upwardly-projecting flaps of the package. One of the packages is shown at Z in Fig. 23 and has upon the top four upwardly-projecting flaps $z$ $z'$ $z^2$ $z^3$.

Figs. 9 and 11 show some of the packages in position to illustrate the method of folding, Fig. 9 showing one of the packages beneath the folding-plate just prior to the folding in of the flap $z$, while Fig. 11 shows the position just after the folding has taken place.

As before stated, the operation of the feed-chute is properly timed with respect to the movement of the conveyer-wings, and said chute crowds a package under the folding-plate H at the proper time to be operated on thereby. The further advance of the conveyer from the position seen in Fig. 11 brings one of the wings $d$ against the package and advances the latter forward beneath a shoe I, having an upturned end $i$ and secured to an upright board I', the top of which is fastened to raised bridges $I^2$ $I^3$, fastened to the top of the trough. The shoe I is narrower than the top of the package, so as to escape the side flaps $z'$ $z^3$ when it strikes the flap $z^2$ to fold it down upon the flap $z$. As seen in Fig. 10, guide-plates J J', secured to the bridges I' $I^3$, secured to the board I', guide the side flaps of the package to the sides of a gluing-wheel K, supported upon a transverse shaft $B^4$, journaled in bearings $b^7$ $b^8$, carried by upward extensions of the side frames $a^7$ $a^8$. Said shaft $B^4$ has fast upon it a sprocket-wheel $b^9$, rotated by a chain $b^a$, driven by a sprocket-wheel $b^c$, Figs. 1 and 2, upon one end of the main driving-shaft B.

The gluing-wheel K is preferably hollow, as is also the shaft $B^4$, Fig. 18, which carries it, and said shaft is provided within the wheel with a series of radial pipes $b^e$, terminating in burners $b^i$. A gas-pipe L is connected to one end of the shaft, so that means are provided for heating the interior of the wheel, openings $k$ being provided in the sides thereof through which the gas may be ignited. Near each of the side faces of the wheel, which are preferably beveled, is a pressure-roller $k'$, suitably supported and spaced away from the wheel to press the given thickness of cardboard thereon, and a glue-pot $K^2$, Figs. 9, 19, and 20, is supported upon the tops of the bridges $I^2$ $I^3$, where the glue-wheel will occupy a notch $k^3$ in its side and close the same against the passage of more glue than it is desired to have run upon the wheel. The glue-pot is preferably provided with hollow walls $k^4$ to contain water and a heating-pipe $k^5$ to furnish the requisite amount of heat. Adjustable plates $k^6$ $k^7$, Figs. 19 and 20, are secured to the walls of the glue-pot adjacent to the notch by means of screws $k^8$ passing through slots $k^9$ in the plates. The slots enable the plate to be adjusted toward and from the wheel when the screws $k^8$ are loosened, and adjusting-screws $k^a$, threaded in the plates and bearing upon the walls, provide means for accurately withdrawing the plates from the wheel sufficiently to permit the latter to gather such a quantity of glue upon its sides as may be desirable for the work. The side flaps of the package in passing between the pressure-rollers and the gluing-wheel are coated with glue from the wheel, and as they are carried onward in the trough they come to a laterally-reciprocating folding-plate M, Fig. 13, which folds in the flap $z'$ on top of the flap $z^2$ and afterward to an opposite laterally-reciprocating folding-plate M', which folds in the flap $z^3$ upon the top of the flap $z'$. These plates are held between guides $m$ $m'$ $m^2$ $m^3$ and are fastened to the top of the trough by means of screws $m^4$ $m^5$ $m^6$ $m^7$. Slots $m^8$ $m^9$ $m^a$ $m^b$ in the plates permit of the lateral movement of the same beneath the screws, and such lateral movement of the plate M is effected through a bracket $m^c$, Fig. 15, secured to the plate and slidingly pivoted in the end of a lever $m^d$, pivoted between its ends at $m^e$ to a bracket $m^f$, secured to the frame, said lever being slidingly pivoted at its opposite end to a rod $m^g$, extended across through the bottom of the trough, in which it is guided and slidingly pivoted to one end $m^h$ of an arm $m^i$ on a shaft $m^j$, journaled in brackets $m^k$ $m^k$, also secured to the frame. The shaft $m^j$, Fig. 17, has an upwardly-projecting arm secured to it, $m^o$, to the upper end of which is slidingly pivoted a bracket $m^p$, Fig. 13, secured to the plate M'. These devices connect the two plates together and are actuated to move the plates by means of an arm $m^q$, Figs. 17 and 14, secured to a (preferably) spring-plate $m^r$, fastened to the frame at $m^s$ and provided with a cam-surface $m^t$ in the path of the projections $d^2$, before referred to, upon the conveyer-blocks $d'$. As one of these blocks passes beneath this cam-surface the plate M is crowded inward into the position seen in Fig. 13, folding down the flap $z'$, the forward edge of the plate at this point being turned upward to slide over the flap. The further movement of the package and of the conveyer-block releases the spring-plate $m^r$ and permits the parts to take the position seen in Figs. 14 and 15, crowding in the plate M' and folding down the flap $z^3$. A projecting finger $m^u$, secured to the plate M, assists in holding down the flap $z'$ and retires just ahead of the plate M'. Both plates are preferably notched at $m^v$ $m^x$ to allow the edges $m^y$ $m^z$ to be turned up to insure against danger of tearing the package. The passing of the package between these plates has completed the folding in of the various sides of the top, and the package next passes beneath a belt N, Fig. 3, running over pulleys $n$ $n'$, mounted on shafts $n^2$ $n^3$, journaled in suitable bearings $n^4$ on the top of the trough, Fig. 1, the shaft $n^2$ being provided with a sprocket-wheel $n^5$, rotated by a chain $n^6$, driven by a sprocket-wheel $n^7$ on the shaft $B^1$. Above the lower half of the belt is a pressure-board $n^8$, Fig. 3, supported by cross-bars $n^9$ $n^a$, held down by bolts $n^b$ $n^c$, Fig. 21, extending through the top pieces of the trough and pulled downward by springs $n^e$ $n^e$, compressed between said pieces of the trough, and nuts $n^f$ $n^g$. This provides a yielding pressure upon the belt, so that the package may raise it slightly and feel the full force of the springs, regardless of slight variations in height. The belt N is preferably of sufficient length to give the glue a chance to set and hold the parts together. On the bottom of the trough and near the end thereof, Fig. 3, is a discharge-belt O, running over pulleys $o$ $o'$ on shafts $o^2$ $o^3$, suitably journaled in the frame, the shaft $o^2$ bearing at one end a pulley $o^4$, driven by a belt $o^5$, extending to a pulley $o^6$ on the shaft $n^2$. The gearing is so arranged that the belt O runs enough faster than the conveyer that as the conveyer brings the packages upon the belt they are carried forward out of the way of the conveyer-wings as the latter round the corner. At this end of the machine is a receiving-trough P, Figs. 1 and 2, upon the bottom of which runs a traveling belt $p$, supported and driven by suitable means. The conveyer-trough rests upon supports $p'$ and is arranged at such a height that the packages will fall from the belt O and, striking the edge of the trough, light in an inverted position upon the belt $p$. This brings the recently-glued ends beneath the package, and as the latter passes onward its own weight serves to hold the parts together until the glue is sufficiently dried. This belt may be of any desired length and may be run at any speed which will take care of the packages from the machine, so that the length of time given the glue to dry may be fixed at whatever may be desirable.

While I consider many of the particular devices illustrated and described above to be novel in themselves, yet I believe certain characteristics of the complete machine to be entirely independent of the particular form or arrangement of the specific devices used, and for that reason I do not limit my invention to the exact construction shown and described.

I claim as new and desire to secure by Letters Patent—

1. In a machine of the class described, the combination with gluing and folding mechanisms, of a main conveyer adapted for being acted upon in succession by said mechanisms, a feed-conveyer arranged to bring packages to a point near the main conveyer, devices for transferring packages from the feed-conveyer to the main conveyer, and means whereby packages brought by the feed-conveyer control the operation of the transferring devices.

2. The combination with gluing and folding mechanisms, of a main conveyer adapted to advance packages to positions for being acted upon by said mechanisms in succession, a feed-conveyer arranged to bring packages to a point alongside said main conveyer, devices for transferring the packages so brought from the feed-conveyer to the main conveyer, means in the path of packages arriving in the feed-conveyer, and adapted to be actuated by said packages, to control the operation of the transferring devices.

3. In a machine of the class described, the combination with a suitable framework, driving mechanism, gluing and folding devices thereon and a main conveyer adapted to engage the packages and carry them through the gluing and folding devices, of a feeding-conveyer parallel with and terminating alongside of the main conveyer, a transverse feed-chute leading from the feeding-conveyer to the main conveyer, a transversely-moving feed-slide adapted to crowd the packages through the feed-chute to the main conveyer, feed driving devices connected with the driving-gear and timed with respect to the conveyer, normally disconnected from the feed-slide, but adapted, by connection therewith, to operate the latter, and devices actuated by the movement of the packages upon the feeding-conveyer to connect the feed-slide and the feed driving devices; substantially as described.

4. In a machine of the class described, the combination with a suitable framework, driving-gear, gluing and folding devices and a main conveyer adapted to engage the packages and carry them through the gluing and folding devices, of a feeding-conveyer terminating alongside of the main conveyer, a feed-chute extending from the feeding-conveyer to the main conveyer, a feeding device operating to move the packages through the feed-chute from the feeding-conveyer to the main conveyer, feed driving-gear adapted by connection therewith to operate the same at proper intervals with respect to the main conveyer and connecting devices between the feed driving-gear and the feed device normally disconnected from said gear and having a portion extending into the path of the packages upon the feeding-conveyer, the engagement of the packages with said portion operating to make the connection with the feed driving-gear and throw the feeding device into operation to move the package from the feeding-conveyer to the main conveyer; substantially as described.

5. The combination with a trough and a conveyer arranged to engage and carry forward packages placed in the trough, a normally depressed folder above the trough, means whereby the movement of said conveyer raises the folder at the proper time, means for pushing a package, laterally, into the trough beneath the raised folder, and means whereby the folder is then forcibly returned to position, folding a flap of the package.

6. The combination with a trough and a conveyer provided with spaced wings traveling in the trough, of a folder normally in position to press the top of a package beneath it in the trough, means whereby the advance of the conveyer raises and releases the folder after the passing of one wing and before the arrival of the next, a spring forcibly depressing the released folder, and means for pushing a package laterally into the trough and beneath the folder while the latter is raised.

7. The combination with a trough and a conveyer provided with a series of wings moving in the trough, of a folder-plate hinged to swing upon an axis transverse to the trough and normally in position to press the top of a package beneath it in the trough, a spring resisting upward swinging of the plate, means whereby the nearest advancing wing lifts the plate, holds it for a fixed interval and releases it, and means for pushing a package laterally into the trough beneath the raised plate during that interval.

8. In a machine of the class described, the combination with a suitable frame and driving mechanism, of suitable folding devices supported in the frame, a main conveyer adapted to carry the packages within range of the folding devices, a gluing-wheel of approximately the same width as the package, means for supplying glue to the sides of said wheel, and devices for bringing the opposite flaps of the package against the sides of the wheel and pressing them thereon to take up the glue; substantially as described.

9. In a machine of the class described, the combination with suitable framework, and driving-gear, of a pair of horizontal conveyer-wheels driven by said gear, a conveyer running over said wheels, a trough adjacent to said conveyer, wings upon the conveyer extending into and traversing the trough, devices above the trough and successively arranged thereon consisting of a rear flap-folding device, a gluing device, side folding devices and a pressing device traveling with the main conveyer and a discharging device running faster than the conveyer, adapted to engage the packages and move them out of the way of the wings as the latter swing around the conveyer-wheels; substantially as described.

10. The combination with a fixed trough and a constantly-moving conveyer provided with wings traveling in the trough and at a distance from each other materially greater than the width of a package, of means for placing a package upon the bottom of the trough at a point at some distance in front of the approaching wing which is to carry it forward, a folder alongside the trough at said point, and means whereby the advance of the conveyer operates said folder while the package awaits said wing.

11. The combination with a fixed package-trough and a conveyer having wings advancing in the trough in position to carry forward packages placed therein, of means for placing packages in the trough between successive wings, means for folding the front and rear flaps, a glue-applying wheel above the path of the packages with its lateral faces in position to touch the passing lateral flaps while they are erect, means for supplying glue to said lateral faces, and means for folding said lateral flaps after they pass the wheel.

12. The combination with a conveyer arranged to advance a series of packages whose top flaps are to be closed, of means for successively folding the front and rear flaps and applying glue to the lateral flaps, two horizontally-sliding folders located in succession along the path of the conveyer and upon opposite sides thereof, and means for suddenly forcing each folder inward as the packages in succession reach the points where the folders are located.

13. The combination with a conveyer arranged to advance a series of means for folding in the rear flap, means for folding in the front flap, and means for applying glue to the lateral flaps, two folders arranged in succession upon opposite sides of the conveyer's path to move horizontally inward and outward together, and means actuated by advancing parts of the conveyer to move each folder inwardly simultaneously with the arrival of the package at a point where its flap will be properly folded by such movement.

14. The combination with an endless conveyer-belt moving in a horizontal plane, of a trough alongside one fold of the belt, wings attached to the belt, moving in the trough and adapted to carry forward packages placed therein, and a more rapidly moving endless belt in position to receive the packages at the end of the trough and move them quickly forward out of the path of said wings.

15. In feeders, a supply-belt, a feed-belt operating in a runway, a feed-chain having feeders thereon coöperating with said runway, a spacer mounted adjacent said runway, a spacer, a cam, a spacer-lever and latch coöperating with said cam, a trigger movably mounted on said spacer to be engaged by articles fed along said supply-belt and to coöperate with said latch to operate said spacer.

16. In feeders, a supply-belt, a runway, a feed-chain provided with feeders coöperating with said runway, a spacer mounted adjacent said runway, a spacer-latch, means to reciprocate said spacer-latch, a trigger to be engaged by articles mounted on said spacer and to coöperate with said latch to reciprocate said spacer.

17. In feeders, a runway, means to feed articles along said runway, means to supply articles adjacent said runway, a movably-mounted spacer, a spacer-latch, means to operate said spacer-latch and a trigger movably mounted on said spacer to be engaged by articles and to cause said latch to actuate said spacer to feed said articles into said runway.

18. In feeders, a runway, feeding means to feed articles along a runway, means to supply articles adjacent said runway, a spacer movably mounted adjacent said runway, actuating means timed to move in conjunction with said feeding means and a trigger to cause the coöperation of said actuating means and said spacer to move articles into said runway.

19. In feeders, a runway, feeding means to feed articles along said runway, a spacer, and actuating means timed in conjunction with said feeding means to operate said spacer when articles are supplied adjacent said runway to force them into said runway into coöperation with said feeding means.

20. In feeders, a runway, feeding means in said runway, means to supply articles adjacent said runway, a stop in the path of said articles, a movable spacer adjacent said stop and actuating means timed in unison with said feeding means to operate said spacer when articles are supplied thereto to force said articles into said runway.

21. In feeders, feeding means, a spacer mounted to reciprocate adjacent said feeding means, means to supply articles to said spacer, a spacer-cam, a spring-pressed latch actuated by said spacer-cam and a trigger mounted on said spacer to be engaged by articles and to engage said latch to operate said spacer to force said articles into coöperation with said feeding means.

In witness whereof I have hereunto set my hand, at Chicago, in the county of Cook and State of Illinois, this 1st day of February, A. D. 1901.

CHARLIE REDD.

Witnesses:
C. G. LIVINGSTON,
CHAS. O. SHERVEY.